United States Patent [19]
Kiss

[11] Patent Number: 5,879,434
[45] Date of Patent: Mar. 9, 1999

[54] MULTI-WASHER AND METHOD OF TOTAL CLEANING OF GASES

[75] Inventor: Günter H. Kiss, Minusio, Switzerland

[73] Assignee: Thermoselect AG, Liechtenstein

[21] Appl. No.: 896,575

[22] Filed: Jul. 18, 1997

[30] Foreign Application Priority Data

Jul. 22, 1996 [DE] Germany ............... 196 29 500.9

[51] Int. Cl.[6] ................................................. B01D 47/06
[52] U.S. Cl. ........................... 95/199; 95/211; 95/224; 96/277; 96/297; 96/300
[58] Field of Search ........................... 95/210, 211, 212, 95/214, 187, 199, 224; 96/233, 274, 277, 290, 295, 296, 297, 299, 300, 123, 130, 131, 132

[56] References Cited

U.S. PATENT DOCUMENTS

| | | | |
|---|---|---|---|
| 1,434,301 | 10/1922 | Liljegran | 96/297 |
| 2,057,579 | 10/1936 | Kurth | 96/297 |
| 2,513,174 | 6/1950 | Hess | 95/214 |
| 3,036,417 | 5/1962 | Mare et al. | 95/213 |
| 3,686,830 | 8/1972 | Huntingdon | 96/296 |
| 3,785,127 | 1/1974 | Mare | 96/297 |
| 3,795,089 | 3/1974 | Reither | 96/300 |
| 3,957,464 | 5/1976 | Teller | 95/196 |
| 4,222,748 | 9/1980 | Argo et al. | 96/233 |
| 4,225,566 | 9/1980 | deVries | 423/210 |
| 4,337,229 | 6/1982 | Teller | 423/225 |
| 4,397,662 | 8/1983 | Bloomer | 96/297 |
| 4,954,148 | 9/1990 | Alexander, Sr. | 96/277 |
| 5,123,936 | 6/1992 | Stone et al. | 95/214 |
| 5,586,995 | 12/1996 | Volhardt et al. | 96/290 |

FOREIGN PATENT DOCUMENTS

| | | |
|---|---|---|
| 49400A1 | 6/1987 | European Pat. Off. |
| 0508243 | 10/1992 | European Pat. Off. |
| 2229446 | 12/1974 | France |
| 3715263 | 11/1988 | Germany |
| 9304777 | 7/1994 | Germany |
| 0210398 | 3/1992 | Hungary |
| 55-22238 | 9/1981 | Japan |

*Primary Examiner*—Duane S. Smith
*Attorney, Agent, or Firm*—Howard & Howard

[57] ABSTRACT

The invention relates to a multi-washer, and to a method of cleaning synthesis gases obtained by the gasification of wastes of the most varied composition. Such multi-washers are used to remove lumpy and adhesive materials from the synthesis gas, such as carbon particles and sulphur. According to the present invention, a horizontal container (1) is sub-divided by partition bulkheads (5) into a plurality of successive wash chambers (2,3,4), which are each provided with a sumpless outflow to a respective pump system (6,7,8). Disposed in each of the wash chambers (2,3,4) is a least one substance exchanger (9) in an oblique position, which is sprayed from both sides with varying quantities of wash liquid. The sprayed wash liquid penetrates into the substance exchangers (9) and, due to the varying quantity, is removed in an directed fashion. As the wash liquid also sprays the wall of the container (1), total self-cleaning of the multi-washer is ensured. In order to prevent any transfer of wash liquid from one wash chamber (2,3,4) into the adjacent wash chamber (2,3,4), a droplet collector (10) is located in the direction of gas flow at the rear or downstream end of each wash chamber (2,3,4).

5 Claims, 1 Drawing Sheet

MULTI-WASHER AND METHOD OF TOTAL CLEANING OF GASES

BACKGROUND OF THE INVENTION

1. Field of the Invention

The invention relates to a multi-washer and to a method of cleaning gasses, particularly of raw synthesis gas from the gasification of municipal and other wastes which contain carbon particles, hydrogen sulphide, water vapor and volatile heavy metals.

2. Description of Related Art

According to the prior art, in order to clean contaminated industrial gases of all types, but also in order to improve the quality of utility gases, the gas to be cleaned is passed through a plurality of horizontally mounted substance exchangers, which are loaded with a wash liquid. These washers have the purpose of removing the materials contained in the gas, such for example as $CO_2$, CO, $NO_x$, $H_2S$ or also solid impurities such as dusts from the gas flow by means of the wash liquid. A plurality of wash liquids are known, which as a rule physically and/or chemically bind, if necessary absorb or adsorb, only one specific toxic material.

The document JP 55-22238 demonstrates such a device for cleaning gases, in which there are located within a substantially horizontally lying container a plurality of wash regions, through which the gas to be cleaned is passed upwards and downwards in a meandering fashion.

The individual wash regions have substance exchangers stacked horizontally one above the other at defined spacings in the form of wash trays consisting of packings with filling members, which are sprayed with wash liquid on one side, on their outer side lying on top. These are thus wash towers, combined into a single pressure vessel, disposed in a horizontal alignment, and through which the gas passes vertically, as is conventional for individual tower scrubbers.

These known columnar washing systems have a series of disadvantages when applied to the cleaning of synthesis gases from waste gasification. Due to the horizontal layering of the individual substance exchangers, the cleaning liquid running off the substance exchangers and charged with materials runs into the further wash trays lying underneath. Particularly in the case of lumpy and adhesive contents such as carbon particles and sulphur, this leads in a short time to clogging and stoppage of the wash trays.

Because of these disadvantages, washers are used which eliminate the above-described substance exchangers and instead blow the gas to be cleaned merely through a spray mist of the cleaning liquid, so-called spray washing. A disadvantage of these spray washers is that the contact surface between gas and liquid is small compared to that of the substance exchangers, and therefore a reduced cleaning effect is achieved. The document EP 0 249 400 A1 illustrates such a washer, in which a horizontally-disposed pressure container is divided into individual zones. In these zones a spray mist of cleaning liquid is produced, through which the gas is passed. The spray mist is then precipitated on inclined droplet collectors and collected in a common sump, which likewise tends to clog due to sedimentation of lumpy and adhesive contained materials.

SUMMARY OF THE INVENTION

The present invention makes available a multi-washer and a method of total cleaning of synthesis gas from the gasification of wastes by means of which, with the aid of substance exchangers, a high cleaning performance is achieved in a small space. The subject multi-washer and the method associated therewith are easily serviced and not liable to clogging, as it is self-cleaning. This is achieved by the subject multi-washer assembly for cleaning raw synthesis gas from the gasification of municipal and other wastes which contain carbon particles, hydrogen sulphide, water vapor and volatile heavy metals. In comparison to an exclusively spray washing system, washers with a substance exchanger are characterized by an increased contact surface between the gas to be cleaned and the wash liquid, and therefore by a considerably better cleaning effect.

According to the present invention, the disadvantages of the prior art washers with substance exchangers are removed by the oblique positioning of the substance exchanger or wash trays, as the cleaning liquid charged with materials is removed downward into the sumpless wash chambers, without coming into contact with another wash tray. Rather, the cleaning liquid runs down on the inclined surface of the substance exchangers or drips therefrom directly onto the base of the sumpless wash chamber, which is cleaned by spraying with wash liquid.

By means of this arrangement of the inclined substance exchangers, it is further possible to spray the uncharged cleaning liquid from both sides onto the substance exchangers. In this way, the liquid penetrates from both exposed sides into the substance exchangers, and water being charged with the gas components to be removed, runs down in an outward direction. By means of the variable quantity at which the cleaning liquid is sprayed onto both sides of the substance exchangers and penetrates into them, a directed removal of the wash liquid from the substance exchangers is achieved. In this way clogging of the substance exchangers is prevented and a self-cleaning effect is achieved.

The various cleaning liquids are passed to the individual wash chambers more advantageously via a pipe extending through the center of the container, which is sub-divided radially by intermediate walls extending in the longitudinal direction into individual concentric zones, which respectively take up the cleaning liquid and pass it to one of the wash chambers. The washer may be provided on the gas outlet side with a wash chamber, which serves to condense water vapor charged with toxic materials.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 shows a multi-washer according to the invention.

DESCRIPTION OF THE PREFERRED EMBODIMENT

Figure 1:
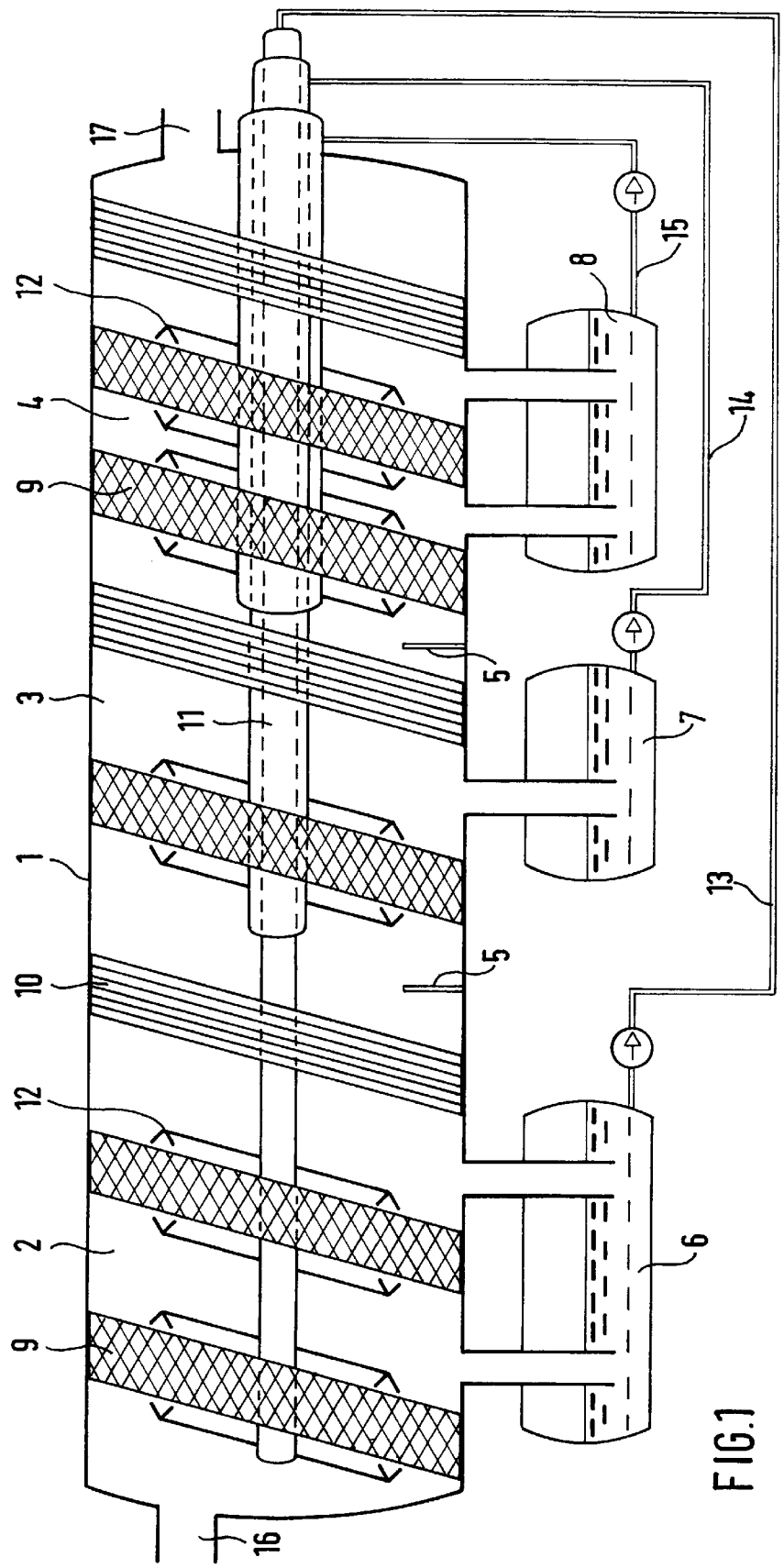
FIG. 1 is

The multi-washer according to the invention comprises a horizontal container 1 with a gas inlet 16 disposed at one end, and a gas outlet 17 disposed at the other end. The container 1 is sub-divided by upright bulkheads 5 into three separate wash chambers 2, 3 and 4. A direct removal outlet to the respective pump system 6, 7 or 8 is associated with each of these sumpless wash chambers 2, 3, 4.

Wash trays are disposed at a predetermined oblique angle to the longitudinal axis of the container 1 as substance exchangers 9 in each of the wash chambers 2, 3 or 4. These substance exchangers 9 are constructed as bulk accumulations with filling members, and are respectively sprayed through nozzles 12 from both exposed sides with a wash liquid, which thus penetrates into the substance exchangers 9. In the preferred embodiment, the upper ends of each substance exchanger 9 are inclined toward the gas outlet 17 relative to the corresponding lower ends which are inclined toward the gas inlet 16. Spraying for each exposed side of the substance exchanger 9 is carried out at its own individual quantity different from the respective other side of the substance exchanger 9.

The spacing between the substance exchangers 9 is selected in dependence on their angle of incidence in such a way that wash liquid drips down directly onto the base of the respective wash chamber 2, 3, 4, and not onto further substance exchangers 9. Wash liquid dripping from each substance exchanger 9 is drained directly to the corresponding pump system 6, 7, 8 located outside of the container 1.

The spray nozzles 12 are supplied with wash liquid from a pipe 11, disposed in the central axis of the container 1 and sub-divided by concentric partition walls into individual enclosed liquid pipes. In this way each individual wash chamber 2, 3, 4 can be supplied with its own wash liquid at its own temperature or at its own pressure. The pipe 11 is connected on its end lying outside the container 1 via return pipes 13, 14 and 15 to the pump systems 6, 7 and 8, so that the wash liquids are circulated.

To prevent any transfer of wash liquid from one wash chamber into the following wash chamber, a likewise obliquely-positioned droplet collector 10 is disposed at the end of each wash chamber 2, 3, 4. This droplet collector 10 filters from the conveyed gas the wash liquid carried along as droplets or mist, which then run down along the droplet collector onto the base of the wash chamber 2, 3, 4 and drain into the associated pump system 6, 7, 8.

In the multi-washer in this embodiment, carbon particles are removed in the first wash chamber 2 with the aid of glycerine in the wash liquid, and it is converted in the second wash chamber 3 with a SULFEROX wash liquid H$_2$S into elementary sulphur, which then runs out of the wash chamber 3 along with the wash liquid.

In a further embodiment, following the last stage of the multi-washer is a further chamber, which serves to condense and thus to remove water vapor charged with toxic material from the gas to be cleaned.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A multi-washer assembly for cleaning raw synthesis gas from the gasification of municipal and other wastes which contain carbon particles, hydrogen sulphide, water vapor and volatile heavy metals, said assembly comprising: a horizontally extending container through which the gas to be cleaned flows along its longitudinal axis, said container having a plurality of successive wash chambers separated by upright bulkheads and located one behind the other along said longitudinal axis of said container in which the gas to be cleaned is subjected to washing processes with various wash liquids, said container including a pipe radially divided into zones each associated with a respective one of said wash chambers, said pipe extending generally along said central axis of said container for supplying each of said wash chambers with washing liquid; a pump assembly associated with and disposed outside of each of said wash chambers; at least one substrate exchanger disposed in each of said wash chambers, each of said substrate exchangers having first and second exposed sides and inclined at a respectively predetermined angle relative to said longitudinal axis of said container; and at least one nozzle associated with each of said substance exchangers for spraying washing liquid onto said first exposed side with a first quantity of wash liquid and onto said second exposed side with a second quantity of wash liquid, said first quantity being different from said second quantity, so that the wash liquid penetrates into said substance exchangers and a directed removal of the wash liquid results.

2. An assembly as set forth in claim 1 further including a droplet collector disposed in at least one of said wash chambers in the flow direction of the gas downstream of said respective substance exchanger and inclined at a respectively predetermined angle to the longitudinal axis of the container.

3. An assembly as set forth in claim 1 wherein said container includes a further chamber downstream of said wash chambers for receiving the gas flow and condensing water vapors charged with toxic materials therefrom.

4. A method of cleaning of synthesis gas from the gasification of municipal and other wastes by removing carbon particles, hydrogen sulphide, water vapor and volatile heavy metals, said method comprising the steps of: passing the synthesis gas in a flow through a generally horizontal container having a longitudinal axis; routing the synthesis gas through a plurality of wash processes in individual wash chambers separated by upright bulkheads, and located one behind the other along the longitudinal axis of the container; directing the synthesis gas through at least one substance exchanger in each of the wash chambers which are inclined relative to the longitudinal axis of the container and have first and second exposed sides; feeding the wash liquid through a pipe along the central axis of the container, and radially dividing the pipe into zones each associated with a respective one of the wash chambers, spraying a first quantity of wash liquid on the first exposed side and a second quantity of wash liquid on the second exposed side of the substance exchangers, the first quantity being different from the second quantity; and separately collecting and then removing the wash liquid dripping from the substance exchanger in each wash chamber so that the subsequent washing stages are not contaminated by the wash liquid which is already charged.

5. A method as set forth in claim 4 further including the step of separating the spray mist and the wash liquid dripping from one of the substance exchangers from the synthesis gas flow by a droplet collector before passing the synthesis gas into a following wash chamber, and then passing the separated materials to the wash liquid.

\* \* \* \* \*